March 30, 1965 S. H. DENGLE 3,175,298
PRINTING PLATE REGISTERING APPARATUS AND METHOD
Filed Feb. 13, 1961 5 Sheets-Sheet 1
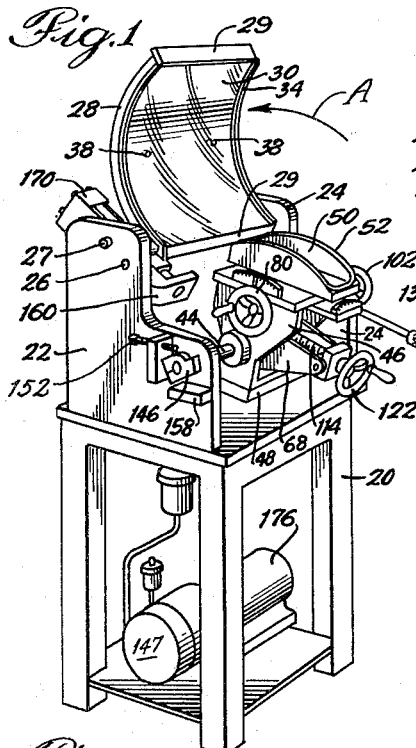
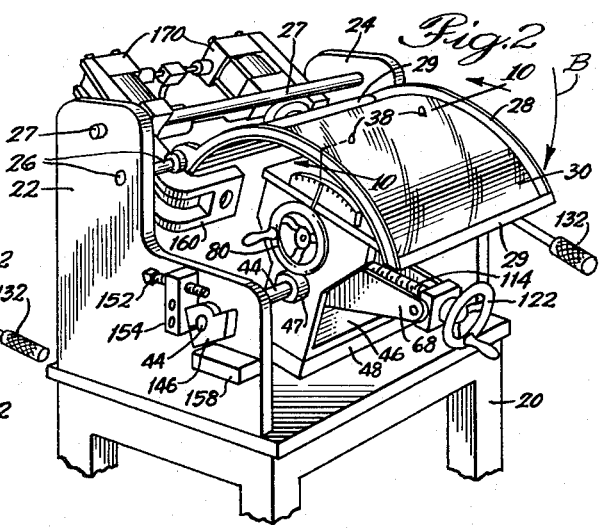
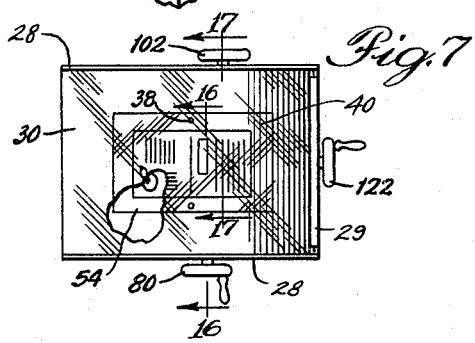
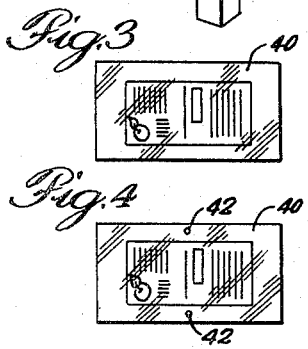
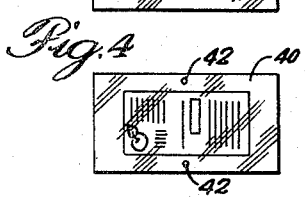
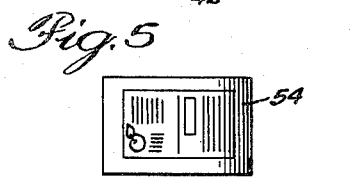
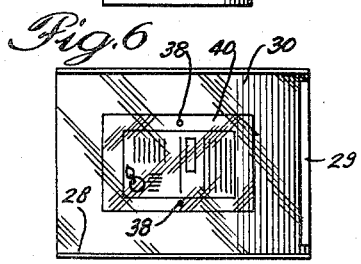
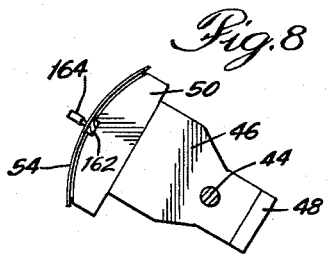
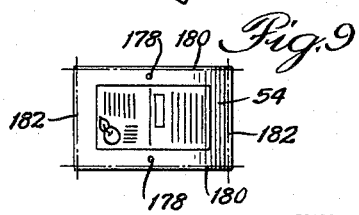
INVENTOR:
Sydney H. Dengle,
BY
Bair, Freeman & Molinare
ATTORNEYS.

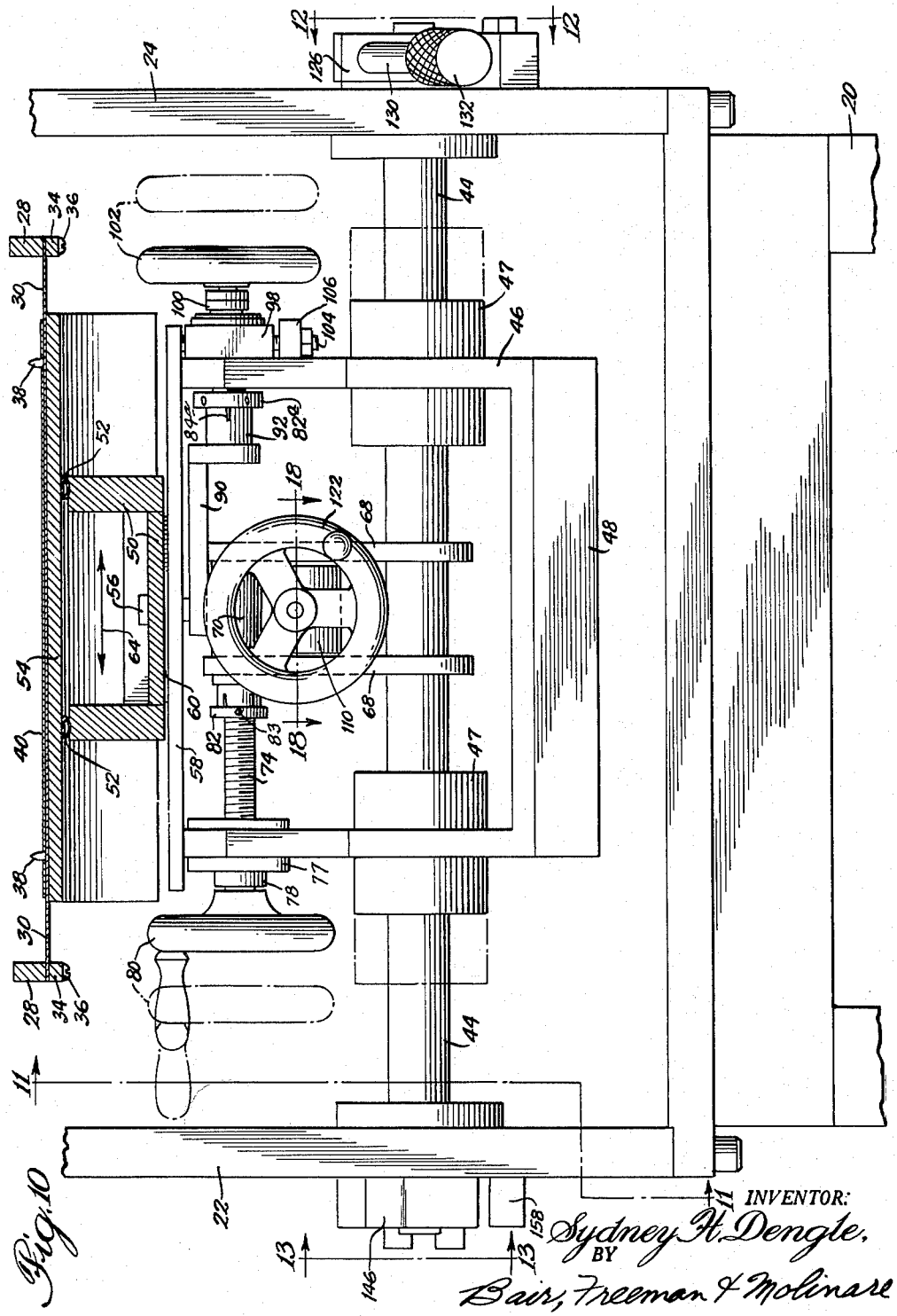

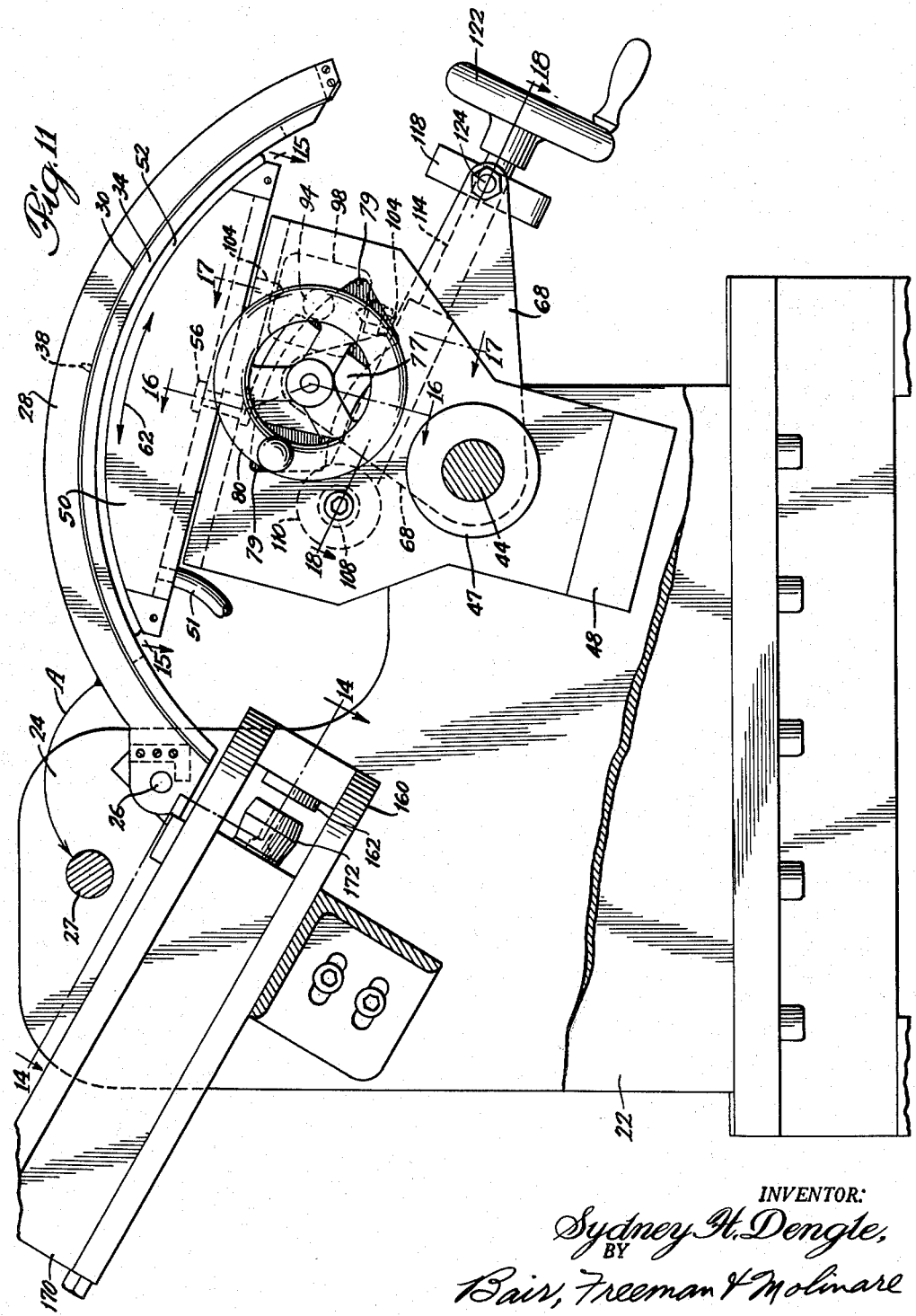

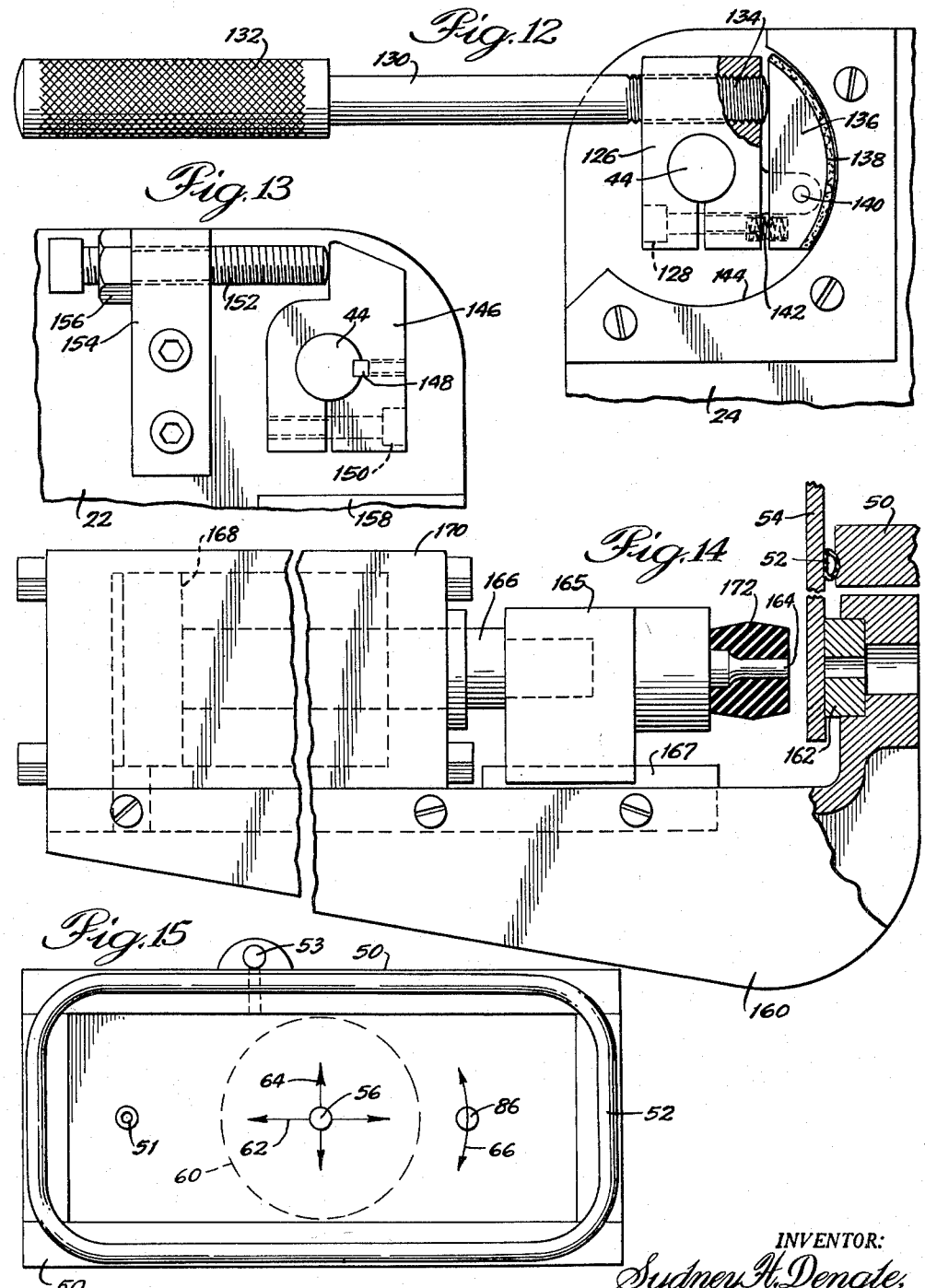

March 30, 1965     S. H. DENGLE     3,175,298
PRINTING PLATE REGISTERING APPARATUS AND METHOD
Filed Feb. 13, 1961     5 Sheets-Sheet 5
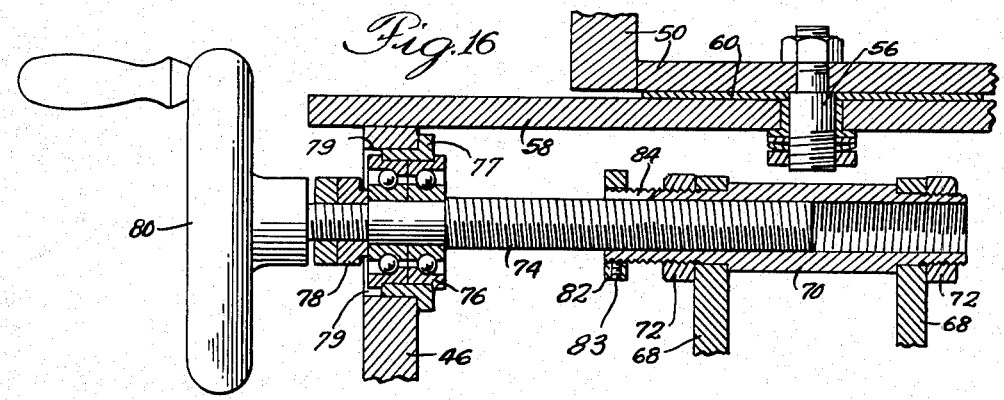
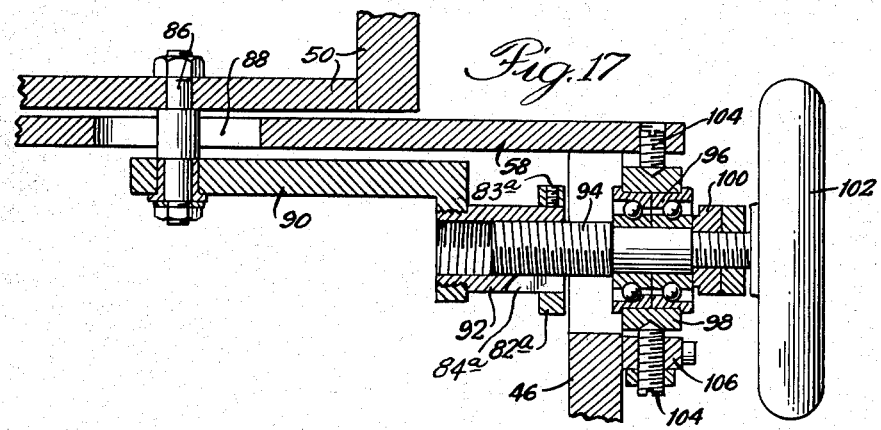
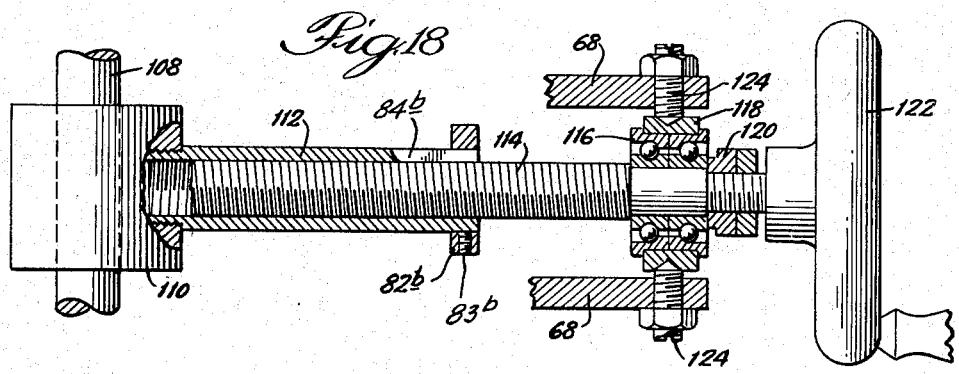
INVENTOR:
Sydney H. Dengle,
BY
Bair, Freeman & Molinare
ATTORNEYS.

United States Patent Office 3,175,298
Patented Mar. 30, 1965

3,175,298
PRINTING PLATE REGISTERING APPARATUS
AND METHOD
Sydney H. Dengle, Des Moines, Iowa, assignor to
Meredith Publishing Company, Des Moines, Iowa, a
corporation of Iowa
Filed Feb. 13, 1961, Ser. No. 89,024
11 Claims. (Cl. 33—184.5)

This invention relates to a method and apparatus for registering printing plates such as those used in multi-color printing. Conventional four-color printing involves the use of a set of four plates or electrotypes wherein each plate prints a different color, usually black, yellow, red and blue, one over the other. A quality printing job requires that the impression printed by each plate be in registration with the others within close tolerances.

One object of my invention is to provide an apparatus for accurately registering all of the printing plates of the set, whether curved for use on a printing cylinder or flat for use on a flat printing bed, to a transparent proof pulled from preferably the black plate of the set, which is then associated in a predetermined position in my apparatus to cooperate with one of the printing plates secured on a vacuum box whereupon adjustments in the position of the printing plate can be made to match the proof, and after registry is secured, an operation is performed to provide register elements on the printing plate such as the punching of a pair of holes therein to be used in establishing the final trim limits of the plate. Each plate of the set is similarly registered with the proof and punched, and the punched holes are uniform throughout the plates with respect to the subject matter to be printed by them.

Another object is to take a transparent proof from the black plate and use it as a reference element to which all the printing plates of the set may be registered, my apparatus including a proof mount assembly having register means cooperating with register means of the proof so that the proof can assume only a predetermined position relative to the proof mount assembly which in turn has a fixed or predetermined position in the apparatus during the registering operation.

Still another object is to provide a saddle to which each plate in turn can be secured, the saddle being provided with means to move it angularly, longitudinally, and/or laterally until the printing plate thereon registers with the transparent proof whereupon the proof is removed from position over the printing plate and the printing plate moved to another position where a pair of register holes are punched therein bearing a predetermined relation to the register means of the transparent proof.

A further object is to provide means for then utilizing the register holes of the printing plates for trimming the plates to a predetermined size and/or shape, and/or providing them with scribed reference lines to be subsequently fitted to a printing cylinder or in the case of flat printing plates to a flat printing bed.

Still a further object is to provide a method for registering a set of printing plates which comprises taking a transparent proof of one of the plates, mounting the proof in a predetermined position, registering one of the plates with the proof, providing the plate with register means in predetermined relation to said predetermined position, and successively registering each of the other plates with the proof and providing each with register means in the same predetermined relation to said predetermined position.

With these and other objects in view, my invention consists in the construction, arrangement and combination of the various parts of my printing plate registering apparatus and a method of procedure for registering a set of printing plates and providing them with register means accurately related throughout the plates of a set as hereinafter more fully set forth, pointed out in my claims and illustrated in detail on the accompanying drawings wherein:

FIGURE 1 is a perspective view of my registering apparatus showing a proof mount assembly in raised position;

FIGURE 2 is a similar perspective view somewhat enlarged showing the proof mount assembly lowered over a printing plate supporting saddle of the apparatus;

FIGURES 3 to 9 are diagrammatic showing of the steps of my method, FIGURES 3 to 7 and 9 being substantially plan views and FIGURE 8 a vertical sectional view;

FIGURE 10 is an enlarged front elevation of the adjusting mechanism for the saddle and printing plate, the saddle, printing plate and associated parts being shown in section on the line 10—10 of FIGURE 2;

FIGURE 11 is an end elevation partly in section on the line 11—11 of FIGURE 10;

FIGURE 12 is an end view (see line 12—12 of FIGURE 10) and shows a saddle tipping and brake mechanism;

FIGURE 13 is an end view (see line 13—13 of FIGURE 10) showing means for effecting oscillations of a rock shaft;

FIGURE 14 is an enlarged sectional view on the line 14—14 of FIGURE 11 and shows a printing plate punching mechanism;

FIGURE 15 is a plan view on the indicated line 15—15 of FIGURE 11 to show the vacuum box and a gasket secured thereto for contact with the printing plate;

FIGURE 16 is an enlarged vertical sectional view through a lateral adjusting mechanism as taken on the lines 16—16 of FIGURES 7 and 11.

FIGURE 17 is an enlarged vertical sectional view through an angular adjusting mechanism as taken on lines 17—17 of FIGURES 7 and 11; and FIGURE 18 is an enlarged horizontal sectional view through a longitudinal adjusting mechanism as taken on the lines 18—18 of FIGURE 11.

On the accompanying drawings, I have used the reference numeral 20 to indicate a table-like structure for mounting my apparatus. A pair of side frame plates 22 and 24 extend upwardly from the table 20 and support a pivot rod 26 and a stop rod 27.

A proof mount assembly is provided in the form of a frame having a pair of curved side members 28, and front and rear cross members 29. A thin sheet of transparent film 30 spans the frame 28–29 and is secured thereto by clamp bars 34 and screws 36. The sheet 30 is preferably quite thin such as .005", and is provided with a pair of locating pins 38 for a transparent proof 40 which as shown in FIGURE 4 has two punched holes 42 therein to cooperate with the locating pins 38 as shown in FIGURE 10. The holes 42 and the pins 38 serve as register means for the proof 40 with respect to the proof mount frame 28–29.

A rock shaft 44 is journaled in the side plates 22 and 24 and a U-shaped saddle 46 has a pair of bearings 47 rotatable and slidable thereon. A vacuum box 50 is supported by the saddle 46 and has a peripheral gasket 52 against which successive printing plates are adapted to be positioned, one such plate being shown at 54. The manner of mounting the vacuum box 50 on the saddle 46 comprises pivotal connection 56 between the bottom of the vacuum box and a plate 58 secured to the upper ends of arms of the saddle. A disc-like washer 60 is interposed between the two.

The vacuum box 50 and the printing plate 54 are thus capable of three independent adjusting movements to wit: longitudinally (or circumferentially) according to the arrows 62 in FIGURES 11 and 15, laterally in accordance with the arrows 64 in FIGURES 10 and 15 and angularly in accordance with the arrow 66 in FIGURE 15 about the pivot 56. To secure these adjustments, reference is made to the construction shown in FIGURES 16, 17, and 18, which show the lateral, angular and longitudinal adjustments, respectively.

Referring to FIGURE 16, a pair of generally triangularly shaped plates 68 (see FIGURE 11) are secured as by welding or the like to the rock shaft 44. An internally threaded sleeve 70 is secured to the plates as by lock nuts 72 and a lateral adjusting screw 74 is threaded therein, the outer end passing through a bearing 76 beyond which is a collar 78. The screw 74 terminates in a hand wheel 80 for rotating the screw. The bearing 76 is carried by an arcuate shoe 77 slidable in an arcuate slot 79 of one arm of the saddle 46. The left hand end of the sleeve 70 is provided with several slots as indicated at 84 and a collar 82 provided with set screws 83 to adjustably contract the slotted end of the sleeve 70 thus providing the desired friction to hold whatever adjustment is made by rotation of the hand wheel 80. Angular adjustment (arrow 66) is secured by means of the mechanism shown in FIGURE 17. A pivot pin 86 is secured to the bottom of the vacuum box 50 and extends through a slot 88 of the plate 58 below which it is pivoted to a link 90. The right hand end of the link has secured thereto a threaded sleeve 92 into which an angular adjusting screw 94 is threaded, the sleeve being provided with an adjustable friction collar 82a similar to the collar 82 of FIGURE 16. The screw 94 is journaled in a bearing 96 being retained therein by a collar 100 and terminates in a hand wheel 102. The bearing 96 is carried by a gimble ring 98 with which a pair of set screws 104 carried by the plate 58 and a bracket 106 of the saddle 46 coact to permit slight oscillations of the bearing 96 in a horizontal plane as required because of the arcuate path of movement of the pivot pin 86 as shown in FIGURE 15 by the arrow 66.

Longitudinal adjustment indicated by the arrow 62 is secured by the mechanism shown in FIGURE 18, a shaft 108 being carried by the saddle 46 and having thereon a slide bearing 110 from which extends a threaded sleeve 112 having also an adjustable friction collar (82b). A longitudinal adjusting screw 114 is threaded in the sleeve 112 and journaled in a bearing 116 carried by a gimble ring 118. A stop collar 120 is provided on the screw 114 and the screw terminates in a hand wheel 122. A pair of set screws 124 are carried by the plates 68 to permit slight oscillations in a vertical plane as the shaft 108 is adjusted radially about the rock shaft 44.

Referring to FIGURE 12, a brake assembly is illustrated wherein a block 126 is secured to the rock shaft 44 as by a clamp screw 128 and carries a rod 130 that acts as a brake set and release means, and as a handle for rotating the rock shaft 44. The rod 130 is threaded as indicated at 134 to variably coact with a brake shoe 136 which is pivoted at 140 to the blocks 126 and is lined as indicated at 138 with brake lining material. A spring 142 normally tends to rotate the brake shoe 136 counterclockwise about the pivot 140 to engage the end of the rod 130. An arcuate surface 144 is provided for the brake lining 138 to frictionally engage. Obviously, when the rod 130 is screwed inwardly with respect to the block 126 the brake is set, and when rotated in the opposite direction the brake is released for purposes which hereinafter will appear.

Referring to FIGURE 13, a stop for the oscillations of the rock shaft 44 is illustrated comprising a stop bracket 146 keyed at 148 to the rock shaft 44 and clamped thereto by a clamp screw 150. An adjustable stop screw 152 is provided for the stop bracket 146 in the position shown and is threaded with respect to a stationary block 154 secured to the side plate 22 of the machine, a lock nut 156 being provided to retain the adjustment of the stop screw. Another stop 158 is provided to limit excessive oscillation of the rock shaft clockwise whereas the stop screw 152 limits its oscillation counter-clockwise for purposes which hereinafter will appear.

Referring particularly to FIGURE 14, a pair of punch assemblies are provided, one for each side of the machine and each comprises an L-frame 160 carrying a die 162 to cooperate with a punch 164 surrounded by a resilient sleeve 172 of rubber or the like. The punch 164 is secured to a slide bracket 165 sliding in a way 167 of the bracket 160, being slid by a plunger 166 that terminates in a piston 168 within a hydraulic cylinder 170. There are two cylinders 170 as best shown in FIGURE 2 whereas FIGURE 14 shows the left hand assembly. The right hand assembly would be in a reverse position so that the short arms of the brackets 160 which support the dies 162 extend toward each other to encompass or receive opposite side edges of the printing plate 54, the left edge being depicted in FIGURE 14.

A vacuum connection 51 (see FIGURES 11 and 15) is provided to the vacuum box 50, and in FIGURE 1 a vacuum pump 174 and motor 176 to operate the same are illustrated. The vacuum connection 51 normally evacuates the vacuum box 50 for securing the printing plate 54 thereto whereas a vacuum breaking valve 53 may be provided as shown in FIGURE 15 to break the vacuum when it is desirable to remove the printing plate from the vacuum box. Also, a suitable hydraulic system (not shown) may be provided operated by the motor 176 for supplying hydraulic fluid under pressure through to punch operating cylinders 170, and the usual control valves (also not shown) are provided therefor.

*Practical operation*

Referring to FIGURE 3, a transparent proof 40 is illustrated such as one made of Mylar and taken from the black plate of the set of color plates. In a page position punch table which forms no part of my present invention and is therefore not illustrated, this transparent proof is matched with certain reference, check or gauge lines of a master plate and provided with register means such as locating holes 42 punched therein as illustrated in FIGURE 4, so that the proof is now prepared for use in my registering apparatus.

The printing plate 54 as shown in FIGURE 5 is then placed on the vacuum box 50 while the parts are in the position shown in FIGURE 1 and vacuum applied to the vacuum box will compress the gasket and securely locate the printing plate on the box, a seal being effected by the gasket 52. Thus, a quickly operable holding means is provided without the necessity of clamps, screws or the like. In this operation, of course, the proof mount assembly consisting of the frame 28–29 and the transparent sheet 30 are in the elevated position shown in FIGURE 1 against the stop rod 27.

Thereupon the proof mount assembly is swung downwardly to the position shown in FIGURE 2 with the transparent sheet 30 overlying the printing plate. This step of the operation is illustrated in FIGURE 6. The operator then positions the proof 40 over the locating pins 38, using the previously punched holes 42, whereupon he is ready to register the printing plate 54 with the proof.

Referring to FIGURE 7, for the next step of my method, the longitudinal, lateral and/or angular adjustment of the printing plate so as to register it with the proof can be made by the hand wheels 122, 80 and 102 respectively, and once registry is secured, the proof mount assembly and the proof located thereon may be returned to the position of FIGURE 1 whereupon the brake shoe 136 is released by rotation of the rod 130, and the handle 132 then used to tilt the saddle 46 and the printing plate from the position shown in FIGURES 1 and 2 to the position shown in FIGURE 8. In this position, the stop bracket 146 on the rock shaft 44 engages the stop screw 152, which has been previously accurately set, in relation to the locating pins 38, and the longitudinal center of the printing plate 54 is at that time centered in relation to the punches 164. Thereupon the punches may be operated to perforate two holes in the side edges of the printing plate. The plate is thereafter rocked back to the position shown in FIGURES 1, 2, and 11, and the vacuum released and the plate removed and replaced by the next one of the set. Thereupon the process is repeated for registering the second printing plate with the proof 40 which serves as a reference plate for all the printing plates successively, and all four of them may thus be registered with the proof and punched, and there will be assurance that they all then register with each other.

The punched printing plate 54 as shown in FIGURE 9 has perforations 178 therein which may be located over locating pins of a trimming machine and the sides of the plates trimmed as indicated by the trim lines 180 and 182 or otherwise trimmed to fit on a printing cylinder or bed. Alternatively, the plates may be scribed with reference lines or otherwise treated as desired for subsequent printing registry of all plates of the set when mounted on the cylinder or bed. The operator is now assured that all four of the plates will be the same width and their side edges in an accurate, predetermined relationship to the subject matter of the plate, or that the scribed lines or other means will bear such predetermined relationship, so that when the plates are subsequently mounted on the printing cylinder or printing bed, the successively printed colors will accurately register with each other.

Some changes may be made in the construction and arrangement of the parts of my printing plate registering apparatus and the method disclosed may be departed from to some extent without departing from the real spirit and purpose of my invention. It is therefore, my intention to cover by my claims any modified forms of structure, use of mechanical equivalents or use of equivalent method steps which may reasonably be included within their scope.

I claim as my invention:

1. In printing plate registering apparatus of the character disclosed, a frame, a vacuum box supported thereon for mounting a printing plate, a proof mounting assembly carried by said frame and superposable on said printing plate and comprising a thin transparent sheet for contact with the printing surface thereof, means for mounting said assembly for accurate assumption of a predetermined position relative to said frame when so superposed, said sheet having register means carried thereby and adapted to physically coact with register means of a transparent proof of one printing plate of a set of printing plates when said transparent proof is positioned to overlie said sheet, means for adjusting said vacuum box and thereby said printing plate relative to said transparent proof to register the subject matter of the printing plate with that of the proof, said proof mounting assembly being movable out of contact with said printing plate, said printing plate being movable to a new and predetermined position relative to said frame, and means at said new position and fixed relative to said frame for applying register means to said printing plate whereby successive printing plates of the set may each be registered with said transparent proof and then with said register means and the same applied thereto, and the register means for all plates of the set will be located similarly with respect to the same subject matter on each of the plates.

2. In printing plate registering apparatus, a frame, means thereon for mounting a printing plate, a proof mounting assembly carried by said frame and superposable on said printing plate and comprising a thin transparent sheet for contact with the printing surface thereof, means for mounting said assembly for accurate assumption of a predetermined position relative to said frame when so superposed, said sheet having register means carried thereby and adapted to physically coact with register means of a transparent proof of one printing plate of a set of color printing plates when said transparent proof is positioned to overlie said sheet, a single means operable for adjusting said printing plate mounting means longitudinally, a second single means operable for adjusting said printing plate mounting means laterally and a third single means operable for adjusting said printing plate mounting means angularly relative to said frame, and therewith said printing plate relative to said transparent proof to register the subject matter of the printing plate with that of the proof, said printing plate being movable to a new and predetermined position relative to said frame, and means at said new position and fixed relative to said frame for applying register means to said printing plate.

3. Printing plate registering apparatus of the character disclosed comprising a frame, mounting means thereon for a printing plate, a proof mounting assembly carried by said frame and superposable on said printing plate and comprising a thin transparent sheet having register means carried thereby and adapted to physically coact with register means of a transparent proof of one printing plate of a set of printing plates, means for mounting said assembly for accurate assumption of a predetermined position relative to said frame when so superposed, three separate and distinct means for adjusting said mounting means longitudinally only, laterally only and angularly only and therewith said printing plate relative to said transparent proof to register the one with the other, said proof mounting assembly being movable out of contact with said printing plate, said printing plate being movable to a new and predetermined position relative to said frame, and means at said new position for punching a pair of register holes in said printing plate whereby successively registered plates of the set may be likewise punched with register holes all located similarly with respect to the same subject matter on each of the plates.

4. Printing plate registering apparatus of the character disclosed comprising a frame, mounting means thereon for a printing plate, a proof mounting assembly carried by said frame and superposable on said printing plate and comprising a thin transparent sheet having register pins carried thereby and adapted to physically coact with register holes of a transparent proof of one printing plate of a set of printing plates, means for mounting said assembly for accurate assumption of a predetermined position relative to said frame when so superposed, three separate means for adjusting said mounting means longitudinally only, laterally only and angularly only and therewith said printing plate relative to said transparent proof to register the one with the other, and means fixed relative to said frame for punching a pair of register holes in said printing plate whereby successively registered plates of the set may be likewise punched with register holes all located similarly with respect to the same subject matter on each of the plates.

5. Apparatus for registering a set of printing plates comprising a frame, a saddle carried thereby for supporting the printing plates successively, means for longitudinally, laterally and angularly adjusting a printing plate relative to said saddle, a proof mounting assembly on which a transparent proof of one of the plates may be mounted in only one position relative thereto and brought into overlying relationship to said printing plate whereupon said adjusting means may be operated for registering subject matter of said printing plate with respect to subject matter of said proof, and means for applying register means to said printing plate.

6. Apparatus for registering a set of different color printing plates comprising a frame, a saddle carried thereby for supporting the printing plates successively, means for adjusting a printing plate relative to said saddle, a proof mounting assembly carried by said frame on which a transparent proof of one of the plates may be mounted in a predetermined position relative thereto and brought into overlying relationship to said printing plate whereupon said means for adjusting may be operated for registering subject matter of said printing plate with that of said proof, and means carried by said frame for applying register means to said printing plate whereby successive printing plates may be likewise registered with said proof and register means applied thereto with assurance that subsequent use of the register means of the printing plates will secure accurate register of all the printing plates during printing operations.

7. Apparatus for registering a set of printing plates comprising a frame, a saddle carried thereby for supporting the printing plates successively, means for adjusting the printing plates relative to said saddle, a proof mounting assembly carried by said frame on which a transparent proof of one of the plates may be mounted with physical restraint to only a single position relative thereto and brought into overlying relationship to said printing plate whereupon said printing plate may be adjusted to register the subject matter thereof with respect to subject matter of said proof, and means carried by said frame for applying register means to said printing plate and likewise successively to the other printing plates of the set to secure accurate register of all the printing plates during subsequent printing operations.

8. Apparatus of the character disclosed comprising a frame, a rock shaft journalled thereon, a saddle rotatably and slidably mounted on said rock shaft, a vacuum box pivoted to said saddle, first and second means carried by said rock shaft for adjusting said saddle circumferentially and longitudinally of said rock shaft, a third means carried by said saddle for adjusting said vacuum box angularly relative to said saddle, a proof mounting assembly comprising a transparent sheet movably carried by said frame and superposable on a printing plate on said vacuum box and having means for physically registering a transparent proof of the printing plate therewith whereby said three means for adjusting may be manipulated to effect registry of the subject matter of said printing plate with the subject matter of said proof, said proof mounting assembly being movable to a position spaced from said printing plate, said printing plate being movable by rotation of said rock shaft to another position, and punching means for the opposite edges of said printing plate at said another position.

9. Apparatus of the character disclosed comprising a frame, a rock shaft journalled thereon, a saddle rotatably and slidably mounted on said rock shaft, a vacuum box pivoted to said saddle, first and second means carried by said rock shaft for adjusting said saddle circumferentially and longitudinally of said rock shaft, a third means carried by said saddle for adjusting said vacuum box angularly relative to said saddle, a proof mounting assembly carried by said frame and comprising a transparent sheet superposable on a printing plate on said vacuum box and having means for physically registering a transparent proof of the printing plate therewith whereby said three means for adjusting may be manipulated to effect registry of the subject matter of said printing plate with the subject matter of said proof, said proof mounting assembly being movable to a position spaced from said printing plate, said printing plate being movable by rotation of said rock shaft to another position, punching means for said printing plate at said another position, brake means for said rock shaft, a lever for rocking said shaft, said lever being threaded with respect to said brake means for releasing the brake or applying it as desired, and a positive stop means for said rock shaft in the punching position.

10. Apparatus for printing plate registration comprising a frame, a rock shaft journalled thereon, a saddle rotatably and slidably mounted on said rock shaft, printing plate mounting means pivoted to said saddle on an axis normal to the axis of said rock shaft, first and second means carried by said rock shaft for adjusting said saddle circumferentially and longitudinally of said rock shaft, a third means carried by said saddle for adjusting said mounting means about said pivot, a proof mounting assembly comprising a transparent sheet carried by said frame and movable to a position superposable on a printing plate on said mounting means and having means for physically registering a transparent proof of said printing plate therewith whereby said three means for adjusting may be manipulated to effect registry of the subject matter of said printing plate with the subject matter of said proof, said proof mounting assembly being also movable to a position spaced from said printnig plate, said printing plate being movable by rotation of said rock shaft to another position, and register applying means for said printing plate at said another position.

11. Apparatus for printing plate registration comprising a frame, a rock shaft journalled thereon, a saddle rotatably and slidably mounted on said rock shaft, printing plate mounting means pivoted to said saddle on an axis normal to the axis of said rock shaft, first and second means carried by said rock shaft for adjusting said saddle circumferentially and longitudinally of said rock shaft, a third means carried by said saddle for adjusting said mounting means about said pivot, a proof mounting assembly comprising a transparent sheet carried by said frame and superposable on a printing plate on said mounting means and having means for physically registering a transparent proof of said printing plate therewith whereby said three means for adjusting may be manipulated to effect registry of the subject matter of said printing plate with the subject matter of said proof, said proof mounting assembly being also movable to a position spaced from said printing plate, said printing plate being movable by rotation of said rock shaft to another position, register applying means for said printing plate at said another position, brake means for said rock shaft, and a lever for rocking said shaft, said lever being threaded with respect to said brake means for releasing the brake or applying it as desired.

References Cited in the file of this patent
UNITED STATES PATENTS

| | | |
|---|---|---|
| 927,049 | Howe | July 6, 1909 |
| 2,679,695 | Bungay | June 1, 1954 |
| 2,680,405 | Faeber | June 8, 1954 |
| 2,736,968 | Faeber | Mar. 6, 1956 |